(12) United States Patent
Dai

(10) Patent No.: US 10,666,425 B2
(45) Date of Patent: May 26, 2020

(54) DIGITAL EDUCATION RECORD MANAGEMENT METHOD BASED ON BLOCKCHAIN TOKEN TECHNOLOGY

(71) Applicant: SHANGHAI NETBAN EDUCATION TECHNOLOGY COMPANY LIMITED, Shanghai (CN)

(72) Inventor: Jianbiao Dai, Shanghai (CN)

(73) Assignee: SHANGHAI NETBAN EDUCATION TECHNOLOGY COMPANY LIMITED, Shanghai (CN)

(*) Notice: Subject to any disclaimer, the term of this patent is extended or adjusted under 35 U.S.C. 154(b) by 183 days.

(21) Appl. No.: 15/996,547

(22) Filed: Jun. 4, 2018

(65) Prior Publication Data
US 2019/0342073 A1 Nov. 7, 2019

(30) Foreign Application Priority Data

May 3, 2018 (CN) .......................... 2018 1 0415091

(51) Int. Cl.
| | |
|---|---|
| *H04L 9/00* | (2006.01) |
| *H04L 9/06* | (2006.01) |
| *G06Q 50/20* | (2012.01) |
| *H04L 9/14* | (2006.01) |
| *H04L 9/30* | (2006.01) |
| *H04L 9/32* | (2006.01) |

(52) U.S. Cl.
CPC ......... *H04L 9/0637* (2013.01); *G06Q 50/205* (2013.01); *H04L 9/14* (2013.01); *H04L 9/30* (2013.01); *H04L 9/3213* (2013.01); *H04L 9/3242* (2013.01); *G06Q 2220/00* (2013.01)

(58) Field of Classification Search
CPC ... H04L 9/0643; H04L 9/3239; H04L 9/3242; H04L 9/3213; H04L 9/0637; G06Q 50/205; G06Q 2220/00
See application file for complete search history.

(56) References Cited

U.S. PATENT DOCUMENTS

| | | | | |
|---|---|---|---|---|
| 10,298,395 | B1 * | 5/2019 | Schiatti | H04L 9/3218 |
| 2018/0225640 | A1 * | 8/2018 | Chapman | G06Q 20/10 |
| 2018/0349617 | A1 * | 12/2018 | Wang | G06F 21/602 |
| 2019/0228133 | A1 * | 7/2019 | Ansari | H04L 9/3263 |

(Continued)

*Primary Examiner* — Beemnet W Dada
(74) *Attorney, Agent, or Firm* — Bayramoglu Law Offices LLC

(57) ABSTRACT

A digital education record management method based on the blockchain token technology, the method includes: generating a fixed number of tokens on the blockchain of the entire network through a hash algorithm; generating an educational institution hash address and a management key matching the educational institution hash address for an educational institution; assigning a sufficient number of tokens to the educational institution according to the scale and requirement of the educational institution; generating a student hash address and a management key corresponding to the student hash address for the student through the hash algorithm; establishing a unified issuing rule of the token by educational institutions, issuing the token to the student when the student meets the rule; reading data on the blockchain node by using a blockchain scanning tool; generating a digital education record for the student according to the data; checking the digital education record through an authorization key.

9 Claims, 1 Drawing Sheet

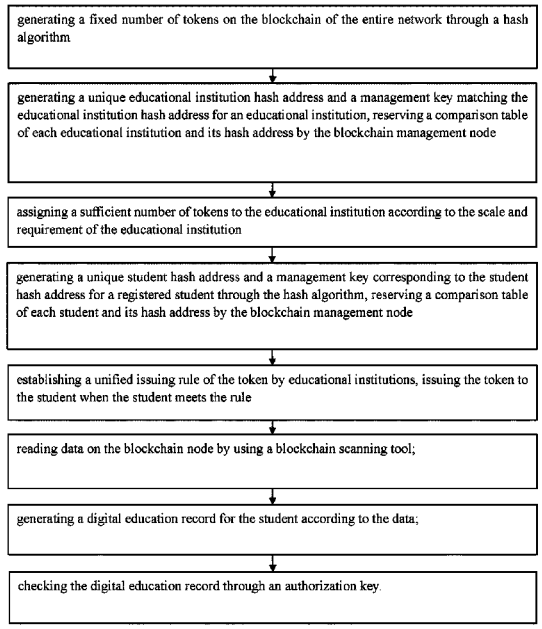

(56) References Cited

U.S. PATENT DOCUMENTS

2019/0340689 A1* 11/2019 Gordon, III ....... G06Q 20/0658
2020/0007316 A1* 1/2020 Krishnamacharya ........................ H04L 9/0637

* cited by examiner

```
┌─────────────────────────────────────────────────────────────────────────────┐
│ generating a fixed number of tokens on the blockchain of the entire network │
│ through a hash algorithm                                                    │
└─────────────────────────────────────────────────────────────────────────────┘
                                      ↓
┌─────────────────────────────────────────────────────────────────────────────┐
│ generating a unique educational institution hash address and a management   │
│ key matching the educational institution hash address for an educational    │
│ institution, reserving a comparison table of each educational institution   │
│ and its hash address by the blockchain management node                      │
└─────────────────────────────────────────────────────────────────────────────┘
                                      ↓
┌─────────────────────────────────────────────────────────────────────────────┐
│ assigning a sufficient number of tokens to the educational institution      │
│ according to the scale and requirement of the educational institution       │
└─────────────────────────────────────────────────────────────────────────────┘
                                      ↓
┌─────────────────────────────────────────────────────────────────────────────┐
│ generating a unique student hash address and a management key corresponding │
│ to the student hash address for a registered student through the hash       │
│ algorithm, reserving a comparison table of each student and its hash        │
│ address by the blockchain management node                                   │
└─────────────────────────────────────────────────────────────────────────────┘
                                      ↓
┌─────────────────────────────────────────────────────────────────────────────┐
│ establishing a unified issuing rule of the token by educational             │
│ institutions, issuing the token to the student when the student meets the   │
│ rule                                                                        │
└─────────────────────────────────────────────────────────────────────────────┘
                                      ↓
┌─────────────────────────────────────────────────────────────────────────────┐
│ reading data on the blockchain node by using a blockchain scanning tool;    │
└─────────────────────────────────────────────────────────────────────────────┘
                                      ↓
┌─────────────────────────────────────────────────────────────────────────────┐
│ generating a digital education record for the student according to the      │
│ data;                                                                       │
└─────────────────────────────────────────────────────────────────────────────┘
                                      ↓
┌─────────────────────────────────────────────────────────────────────────────┐
│ checking the digital education record through an authorization key.         │
└─────────────────────────────────────────────────────────────────────────────┘
```

DIGITAL EDUCATION RECORD MANAGEMENT METHOD BASED ON BLOCKCHAIN TOKEN TECHNOLOGY

CROSS REFERENCE TO RELATED APPLICATIONS

This application is based upon and claims priority to Chinese Patent Application CN201810415091.3, field on May 3, 2018, the entire content of which is incorporated herein by reference.

TECHNICAL FIELD

The present invention relates to the application of blockchain technology in education record management, specifically relates to a digital education record management method based on blockchain token technology.

BACKGROUND

Due to the development of virtual currency, the blockchain technology has become more and more mature. It is common to record various data through the distributed accounting mechanism of the blockchain. However, people are short of a simple method with easy operation to perform study recording on the blockchain. Currently, the experience of a learner in different educational and training institutions is short of an impartial and objective record and inquiry mechanism, especially for the non-qualification education such as the short term training.

SUMMARY

In order to solve the above-mentioned technical problems, the present invention provides a digital education record management method based on the blockchain token technology to achieve the purpose of systematically recording the non-qualification learning experiences of students, ensuring the authenticity of the learning experiences of the students, and facilitating the employer to inquire the learning experiences of employees.

To achieve the above-mention objective, the technical solution of the present invention is as follows. A digital education record management method based on the blockchain token technology, the steps of the method are as follows: generating a fixed number of tokens on the blockchain of the entire network through a hash algorithm; generating a unique educational institution hash address and a management key matching the educational institution hash address for a cooperative educational institution through a hash algorithm, reserving a comparison table of each educational institution and its hash address by the blockchain management node; assigning a sufficient number of tokens to the educational institution according to the scale and requirement of the educational institution; generating a unique student hash address and a management key corresponding to the student hash address for a registered student through the hash algorithm, reserving a comparison table of each student and the hash address by the blockchain management node; establishing a unified issuing rule of the token by educational institutions, issuing the token to the student when the student meets the rule; reading data on the blockchain node by using a blockchain scanning tool; generating a digital education record for the student according to the data; checking the digital education record through an authorization key.

Further, the method of generating a fixed number of tokens on a blockchain of the entire network is as follows: issuing tokens on the blockchain with a contract code through an Ethereum blockchain node. The specific steps are: installing an Ethereum mist client-side, and generating an Ethereum account by using the function menu of the mist client-side; editing and establishing an intelligent contract about token characteristics and token transaction characteristics by using a solidity tool; defining a name, a symbol, a number and a decimal place characteristic of the token by using the mist client-side, publishing the contract with a built-in deploy method of the mist client-side, meanwhile generating the tokens with required numbers and characteristics.

Further, the management key matching the educational institution hash address includes a public key and a private key. The encryption and decryption rules of the management key matching the educational institution hash address is generated by performing a calculation on a SHA-256 hash value of the account with the use of an elliptic curve encryption algorithm. The management key corresponding to the student hash address also includes a public key and a private key. The encryption and decryption rules of the management key corresponding to the student hash address is also generated by performing a calculation on a SHA-256 hash value of the account with the use of the elliptic curve encryption algorithm.

Further, the method of assigning a sufficient number of the tokens to the educational institution is: distributing the tokens to the educational institution hash address and automatically recording on the entire network nodes of the blockchain simultaneously.

Further, the unified token issuing rule established by educational institution is as follows: the student completes one day of study or passes a test.

Further, issuing the token to the student when the student meets the rule includes transferring the token from the educational institution hash address to the student hash address. The hash value, date, time and number of the token transferring procedure are recorded on the entire network blockchain nodes in a real time. When the token is transferred, the authorization needs to be performed by the educational institution through the key.

Further, the blockchain scanning tool is Etherscan or Web3js. Reading the date on the blockchain node includes acquiring the latest token transferring data on the entire network blockchain nodes anytime.

Further, the method of generating a digital education record for a student according to the data includes acquiring a situation and related data that a student obtains the tokens in different educational institutions in different periods through a comparison table of the educational institution hash address and a comparison table of the student hash address, thereby, generating a digital education record for a student.

Further, the hash value, date, time, and number of the token transferring procedure are converted into a form of character string by a hash algorithm. The character string is a history record of the study of the student.

The present invention has the following advantages.

(1) The present invention systematically records the learning experiences of the students through the blockchain technology, facilitating the employing unit to inquire the learning experiences of the employees.

(2) The present invention systematically records the learning experiences of students through the blockchain technology, ensuring the authenticity of the recorded learning experiences.

(3) The present invention encourages the student to study by the tokens.

BRIEF DESCRIPTION OF THE DRAWING

In order to more clearly describe the technical solutions in the embodiments of the present invention or in the prior art, the drawing required in the description of the embodiments or the prior art will be briefly described below.

FIG. 1 is a flow chart of a digital education record management method based on a blockchain token technology disclosed in an embodiment of the present invention.

DETAILED DESCRIPTION

The technical solutions in the embodiments of the present invention will be clearly and completely described with reference to the drawing in the embodiments of the present invention.

The invention provides a digital education record management method based on a blockchain token technology. The working principle of the method is to systematically record the learning experiences of the students through the blockchain technology, so as to achieve the purpose of systematically recording the non-qualification learning experiences of the students, ensuring the authenticity of the learning experiences of the students, facilitating employers to inquire the learning experiences of the employees.

The present invention will be further described in detail with reference to the following embodiments and specific method.

As shown in FIG. 1, a digital education record management method based on the blockchain token technology, the steps of the method are as follows: generating a fixed number of tokens on the blockchain of the entire network through a hash algorithm; generating a unique educational institution hash address and a management key matching the educational institution hash address for a cooperative educational institution through a hash algorithm, reserving a comparison table of each educational institution and its hash address by the blockchain management node; assigning a sufficient number of tokens to the educational institution according to the scale and requirement of the educational institution; generating a unique student hash address and a management key corresponding to the student hash address for a registered student through the hash algorithm, reserving a comparison table of each student and hash address by the blockchain management node; establishing a unified issuing rule of the token by educational institutions, issuing the token to the student when the student meets the rule; reading data on the blockchain node by using a blockchain scanning tool; generating a digital education record for the student according to the data; checking the digital education record through an authorization key.

The method of generating a fixed number of tokens on a blockchain of the entire network is as follows: issuing tokens on the blockchain with a contract code through an Ethereum blockchain node. The specific steps are: installing an Ethereum mist client-side, and generating an Ethereum account by using the function menu of the mist client-side; editing and establishing an intelligent contract about token characteristics and token transaction characteristics by using a solidity tool; defining a name, a symbol, a number and a decimal place characteristic of the token by using the mist client-side, publishing the contract with a built-in deploy method of the mist client-side, meanwhile generating the tokens with required numbers and characteristics.

The management key matching the educational institution hash address includes a public key and a private key. The encryption and decryption rules of the management key matching the educational institution hash address is generated by performing a calculation on a SHA-256 hash value of the account with the use of an elliptic curve encryption algorithm. The management key corresponding to the student hash address also includes a public key and a private key. The encryption and decryption rules of the management key corresponding to the student hash address is also generated by performing a calculation on a SHA-256 hash value of the account with the use of the elliptic curve encryption algorithm. The password rule of the key in this application is generated by using the elliptic curve encryption algorithm, but it is not limited to the elliptic curve encryption algorithm.

The method of assigning a sufficient number of the tokens to the educational institution includes distributing the tokens to the educational institution hash address and automatically recording on the entire network nodes of the blockchain simultaneously.

The unified token issuing rule established by educational institution is as follows: the student completes one day of study or passes a test, and other rules generated by the educational institution according to the teaching situation thereof.

The issuing of the token to the student when the student meets the rule includes transferring the token from the educational institution hash address to the student hash address. The hash value, date, time and number of the token transferring procedure are recorded on the entire network blockchain nodes in a real time. When the token is transferred, the authorization needs to be performed by the educational institution through the key.

The blockchain scanning tool is Etherscan or Web3js. The reading of the date on the blockchain node includes acquiring the latest token transferring data on the entire network blockchain nodes anytime. The scanning tool is not limited to Etherscan or Web3js.

The method of generating a digital education record for a student according to the data includes acquiring a situation and related data that a student obtains the tokens in different educational institutions in different periods through the comparison table of the educational institution hash address and a comparison table of the student hash address, thereby, generating a life-time recorded and tamper-resistance digital education record based on the blockchain for a student.

The hash value, date, time and number of the token transferring procedure are converted into a form of character string by a hash algorithm. The character string is a history record of the study of the student.

The students may send the learning history to the employing unit through electronic means by authorization through the key.

What has been described above is merely a preferred embodiment of the digital education record management method based on the blockchain token technology disclosed in the present invention. It should be noted for those of ordinary skill in the art, a plurality of variations and improvements may be made without departing from the creation concept of the present invention, which all fall within the protection scope of the present invention.

What is claimed is:

1. A digital education record management method based on a blockchain token technology, comprising:
   generating a fixed number of tokens on a blockchain of an entire network through a first hash algorithm;
   generating a unique educational institution hash address and a management key matching the educational institution hash address for a cooperative educational institution through a second hash algorithm;
   reserving a comparison table of each educational institution and the educational institution hash address of each educational institution by a blockchain management node;
   assigning a sufficient number of tokens to the educational institution according to a scale and requirement of the educational institution;
   generating a unique student hash address and a management key corresponding to the unique student hash address for a registered student through a third hash algorithm;
   reserving a comparison table of each student and the unique student hash address of each student by the blockchain management node;
   establishing a unified issuing rule of the token by the educational institutions;
   issuing the token to the student when the student meets the unified issuing rule;
   reading data on the blockchain node by using a blockchain scanning tool;
   generating a digital education record for the student according to the data;
   checking the digital education record through an authorization key.

2. The digital education record management method based on the blockchain token technology according to claim 1, wherein the method of generating the fixed number of the tokens on the blockchain of the entire network comprises:
   issuing the tokens on the blockchain with a contract code through an Ethereum blockchain node, and specific steps comprise:
   installing an Ethereum mist client-side, and generating an Ethereum account by using a function menu of the mist client-side;
   editing and establishing an intelligent contract about token characteristics and token transaction characteristics by using a solidity tool;
   defining a name, a symbol, a number and a decimal place characteristic of the token by using the mist client-side;
   publishing the intelligent contract with a built-in deploy method of the mist client-side, meanwhile generating the tokens with required numbers and characteristics.

3. The digital education record management method based on the blockchain token technology according to claim 1, wherein
   the management key matching the educational institution hash address comprises a first public key and a first private key, a first encryption and first decryption rules of the management key matching the educational institution hash address is generated by performing a calculation on a SHA-256 hash value of the account with the use of a first elliptic curve encryption algorithm;
   the management key corresponding to the student hash address also comprises a second public key and a second private key, a second encryption and second decryption rules of the management key corresponding to the student hash address is also generated by performing a calculation on a SHA-256 hash value of the account with the use of a second elliptic curve encryption algorithm.

4. The digital education record management method based on the blockchain token technology according claim 1, wherein
   a method of assigning the sufficient number of the tokens to the educational institution is: distributing the tokens to the educational institution hash address and automatically recording on the entire network nodes of the blockchain simultaneously.

5. The digital education record management method based on the blockchain token technology according to claim 1, wherein
   the unified issuing rule established by the educational institution is as follows: the student completes one day of study or passes a test.

6. The digital education record management method based on the blockchain token technology according to claim 1, wherein a method of issuing the token to the student when the student meets the unified issuing rule includes
   transferring the token from the educational institution hash address to the student hash address;
   recording a hash value, a date, a time and a number of a token transferring procedure on entire network blockchain nodes in a real time,
   when the token is transferred, an authorization needs to be performed by the educational institution through a key.

7. The digital education record management method based on the blockchain token technology according to claim 1, wherein
   the blockchain scanning tool is Etherscan or Web3js;
   the reading of the date on the blockchain node includes acquiring a latest token transferring data on the entire network blockchain nodes anytime.

8. The digital education record management method based on the blockchain token technology according to claim 1, wherein
   a method of generating the digital education record for a student according to the data includes
   acquiring a situation and related data that the student obtains the tokens in different educational institutions in different periods through the comparison table of the educational institution hash address and a comparison table of the student hash address,
   thereby generating the digital education record for the student.

9. The digital education record management method based on the blockchain token technology according to claim 6, wherein
   the hash value, the date, the time, and the number of the token transferring procedure are converted into a character string by a forth hash algorithm, the character string is a history record of the study of the student.

* * * * *